(12) United States Patent
Thompson (10) Patent No.: US 7,677,662 B2
(45) Date of Patent: Mar. 16, 2010

(54) REMOVABLE, REVERSIBLE, PROTECTIVE HAMMOCK-STYLE SEAT COVER

(76) Inventor: Kevin Thompson, 211 N. Jackson St., Arlington, VA (US) 22201

( * ) Notice: Subject to any disclaimer, the term of this patent is extended or adjusted under 35 U.S.C. 154(b) by 296 days.

(21) Appl. No.: 11/866,672

(22) Filed: Oct. 3, 2007

(65) Prior Publication Data
US 2009/0091165 A1 Apr. 9, 2009

(51) Int. Cl.
*A47C 31/00* (2006.01)
*A47C 7/62* (2006.01)

(52) U.S. Cl. ............ 297/223; 297/228.12; 297/228.13; 297/188.01

(58) Field of Classification Search ................. 119/771, 119/28.5; 5/118; 297/223, 253, 228.13, 297/228.12, 219.1, 188.19, 226, 229, 188.01
See application file for complete search history.

(56) References Cited

U.S. PATENT DOCUMENTS

| | | | | |
|---|---|---|---|---|
| 1,051,566 A | * | 1/1913 | Dreher | 297/226 |
| 2,040,463 A | * | 5/1936 | Brueckl | 297/253 |
| 2,109,652 A | * | 3/1938 | Emmey et al. | 297/253 |
| 2,172,890 A | * | 9/1939 | Phillips | 297/226 |
| 2,227,180 A | * | 12/1940 | Falk | 297/223 |
| 2,801,681 A | * | 8/1957 | Crane | 297/253 |
| 2,833,341 A | * | 5/1958 | Bornstein | 297/229 |
| 3,185,523 A | * | 5/1965 | Morrill, Jr. | 297/226 |
| 3,199,916 A | * | 8/1965 | Chiarenza | 297/223 |
| 4,943,105 A | * | 7/1990 | Kacar et al. | 296/24.31 |
| 5,547,249 A | * | 8/1996 | Riley et al. | 297/228.13 |

OTHER PUBLICATIONS

Canine Covers—travel comfort for dogs, http://www.caninecovers.com/, Rear Seat Hammock—Sling, 4 pages (2008).

* cited by examiner

*Primary Examiner*—Milton Nelson, Jr.
(74) *Attorney, Agent, or Firm*—Nixon & Vanderhye PC (57) ABSTRACT

The illustrative exemplary non-limiting embodiments relate to a seat cover that may include such features as a protective first side, multiple front securing straps arranged on a leading edge, and multiple rear securing straps arranged on a trailing edge. The protective cover can be held in place by securing the straps to headrests in the car. Additionally, the cover may include multiple pockets, accessible through an upwards facing side of the cover, and capable of being slid into a gap between an upper portion lower portion of the rear seats of a vehicle. One or more objects, placed within the pockets when the pockets are in position, help to hold the cover in place. The cover may also be reversible, machine-washable, and easy to remove and install.

11 Claims, 9 Drawing Sheets

REMOVABLE, REVERSIBLE, PROTECTIVE HAMMOCK-STYLE SEAT COVER

FIELD

The technology herein relates generally to covers for protecting vehicle seats while transporting things that might damage the seat, such as animals. More specifically, the technology herein relates to removable, reversible protective hammock-style covers that can be removably installed in a rearward seat of a vehicle and secured in place using a reversible pocket system.

BACKGROUND AND SUMMARY

People enjoy taking their dogs along with them in their cars, and sometimes need to do so regardless of whether they enjoy it or not. Anyone who has owned a dog knows how much dogs loves to go for rides in the car, and how difficult it can sometimes be to restrain a dog from leaping into a car while trying to clear adequate space. As much as owners and pets alike enjoy these rides, certain issues may arise when dogs sit in the same seats that will later be used by people. A non-exhaustive list of these issues includes:
1) Dog hair on the seats and floor
2) Water and mud on seats if it has been raining/snowing and/or the dog has somehow gotten wet
3) Wear and tear of seats from a dog's hard nails and from the dog moving about
4) Slobber and other fluids soiling the seats
5) Dogs distracting drivers by going in front seat
6) Dogs getting injured or alarmed from slipping off of a vehicle's seat and onto the floor when the vehicle brakes In the past, seat covers, towels and blankets have been employed to address some of these issues, but these solutions may have their own problems, making them less than ideal solutions for dogs traveling in cars. For example, towels and blankets aren't always reliable protectors since they can easily come off the seat when a dog moves around. Seat covers may be difficult to install and remove, and thus they may be installed and left in place. People wearing clean clothes won't likely want to sit on soiled, smelly, and/or fur-ridden covers. Neither traditional seat covers nor towels inhibit dogs from jumping in the front seat and possibly distracting the driver, nor does either prevent a dog from falling on the floor when braking.

Some previous rear seat covers required that the cover slip over the corners and across the top of the seat back. This may no longer be as feasible as it once was, since many vehicles now have headrests and shoulder straps that prevent the cover from being draped over and down the top and corners. This added complexity may make seat covers even more difficult to put on and take off when they are designed to accommodate the additional headrest and shoulder strap features of vehicle seats.

More recently, a variation of the seat cover has been used that forms a hammock-like structure when installed. This device addresses many of the problems of having a dog ride in a car and helps prevent the dog from going in the front seat. These "hammock" systems, however, have several potential problems. For example, the hammocks can slide around on the seat cushion, they can sag in the gap between the front and rear seats, and humans often cannot ride in the back with the dog when the hammocks are installed since the portion that extends up the back of the front seats prevents humans from hanging their legs down. While there are some hammocks that have split front portions to allow humans to ride in back with a dog, these may separate at the top of the split when in the zipped up position, allowing the split to inadvertently open. Gravity over time or a dog applying pressure to the top of the split are several examples of how this can occur.

One attempt at solving the problem of having the hammock not securely fastened to the back seat include straps which are sewn to the non-facing (bottom) side of the hammock. These straps are threaded through hard plastic tubes, but the tubes may be difficult to insert in the seam between the seat back and bottom, since the user needs to reach behind the hammock to access the tubes. Also, if there is not enough slack in the straps, the tubes may be difficult to insert while simultaneously keeping the main portion of the hammock in place. Since the user must reach underneath/behind the hammock to install the tubes, it may be desirable to place the tubes into position first. If this is done first, however, the tubes can pop out when the user pulls the upper portion of the hammock up and over the top of the seat back to connect to the headrests mounted on the top of the seat back.

Additionally, the hammocks often get dirty, and it may be desirable to wash the hammock. When the hard plastic tubes are permanently installed, the drums inside of automated washers and dryers can be damaged when the hammock is placed in them for cleaning and drying. The damage may occur when the permanently attached tubes bang up against the drums inside of these machines as the drums rotate at high speeds.

Further, since the tubes are permanently attached to one side of the cover and can likely only function properly when used on that side, it is difficult to make reversible covers, which allow for features such as different colors, different materials, etc. on opposing sides.

The exemplary illustrative non-limiting implementations provide a comprehensive solution to address the problems associated with animals traveling in vehicles. Exemplary features of the illustrative implementations accomplish at least the following:
 1. Protect the vehicle's seats
 2. Stay in place once installed
 3. No moving forward and thus sagging into the gap between front and rear seats
 4. Easy to install and remove
 5. Inhibit a dog from going in the front seat
 6. Prevent a dog from falling on the vehicle's floor when the vehicle brakes
 7. Allow humans to ride along with a dog in the rear seat when installed
 8. Can be machine washed and dried without damaging the washer or dryer
 9. Accommodate multiple headrests/shoulder straps/seat belt buckles
 10. Are reversible The exemplary illustrative non-limiting implementations protect the rear seat in a vehicle by draping down over the seat back portion of the seat, across the seat cushion, and up the back of the front seats. The exemplary illustrative non-limiting implementations thus forms comfortable hammock style seat covers.

BRIEF DESCRIPTION OF THE DRAWINGS

These and other features will be better and more completely understood by referring to the following detailed description of exemplary non-limiting illustrative embodiments in conjunction with the drawings of which.

DETAILED DESCRIPTION

Figure 1:
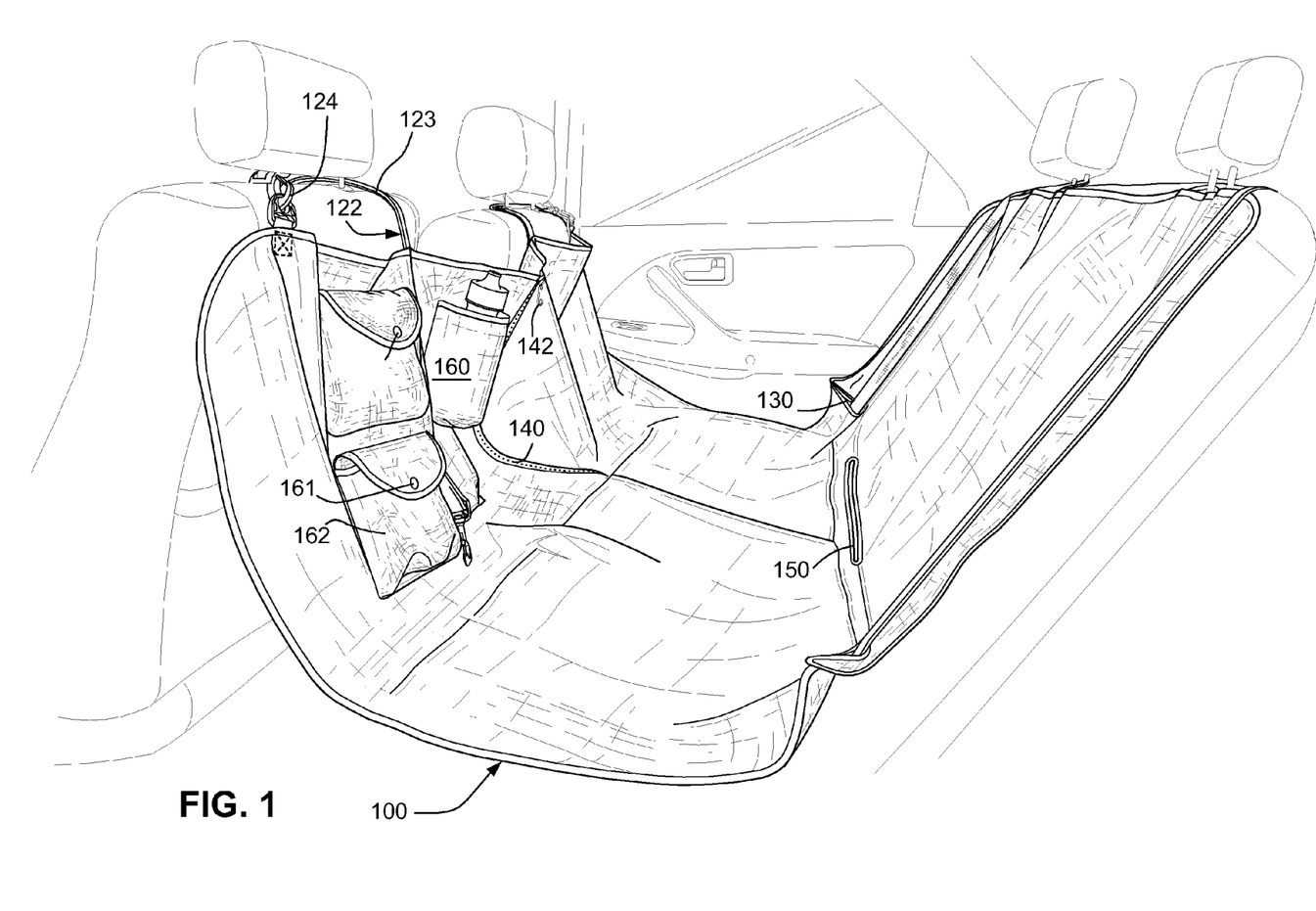
FIG. 1 is a view of an exemplary hammock-style seat cover having been deployed in a vehicle.

FIG. 1 is a view of an exemplary hammock-style seat cover 100 having been deployed in a vehicle. Various exemplary features can be seen in this view. For example, the front edge of the seat cover 100 is attached to the headrests of the drivers seat by a securing system 122. In this exemplary implementation, the securing system 122 includes nylon straps 123 and a hook-and-eyelet combination 124 for securing the straps around the headrest, although any suitable fastening system can be used.

Also visible are various storage compartments 162. These compartments can be provided in any number and size, and can even be modified to accommodate specialized needs such as compartment 160 holding a water bottle. The pouches may additionally be provided with fasteners 161 so that their contents do not fall out if the cover is flipped over. These fasteners 161 can also prevent hungry pets from rummaging through treats stored in the compartment 162.

The centerline of this exemplary implementation is split by a dividing zipper 140. By pulling on tab 142, the zipper opens, and one or both halves of the seat cover 100 can be unfastened from the headrests and lowered into the floor space between the front and back seats. This allows one or more passengers to ride in back with a pet. The passengers can sit on the lowered side with their feet in the footwell, and the raised side still protects the seat and animal.

In addition, since the passengers riding in back need seatbelts, notch 130 allows access to a seatbelt strap and 2-way zipper 150 allows access to the remaining portion of the restraint. This aids in keeping a person in the back safe while sitting on an installed seat cover.

The portions of a vehicle's seats that may need to be protected are, for example, the surfaces of the seat back, the bottom seat cushion, and the back of the front seats. The exemplary illustrative non-limiting implementation is one piece of material that extends down the surface of the seat back, across the seat bottom cushion, and up the back of the front seats, thus providing a shield that prevents water, mud, dirt, or other debris from coming into contact with the vehicle's seats. This material may be made of a durable synthetic fabric such as nylon, polyester, or any other suitable material. In one exemplary implementation, the material is of a sufficient denier (such as 600 denier vinyl coated) to withstand the abrasion that may be encountered by either humans or animals (such as canines) riding on it. Variations that include foam or other types of padding could also be used (sewn in quilted fashion) in between two layers of material for implementations that are reversible. This durable cover comprises the shield required to protect the vehicle's seats.

Since the exemplary illustrative non-limiting implementations form a hammock shape when installed, the portion of the cover that extends across the vehicle's seat cushion and up the back of the vehicle's front seats acts as a barrier to inhibit a dog riding in the back seat from attempting to get into the front seat. It also prevents a dog riding in the back seat from falling on the floor when braking.

Figure 2A:
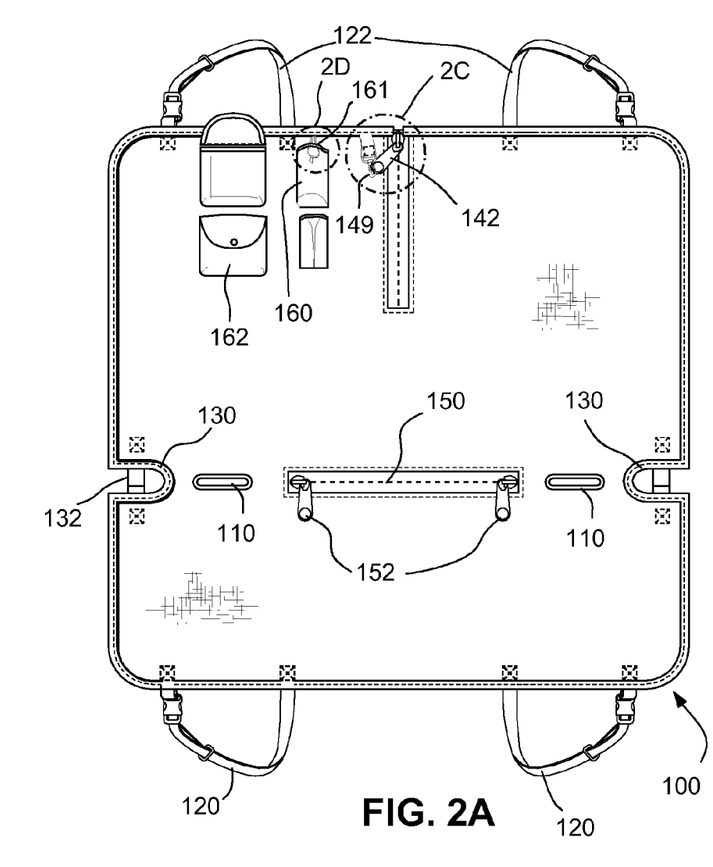
FIGS. 2A and 2B are plan views of a front and back of an exemplary hammock-style seat cover.
Figure 2B:
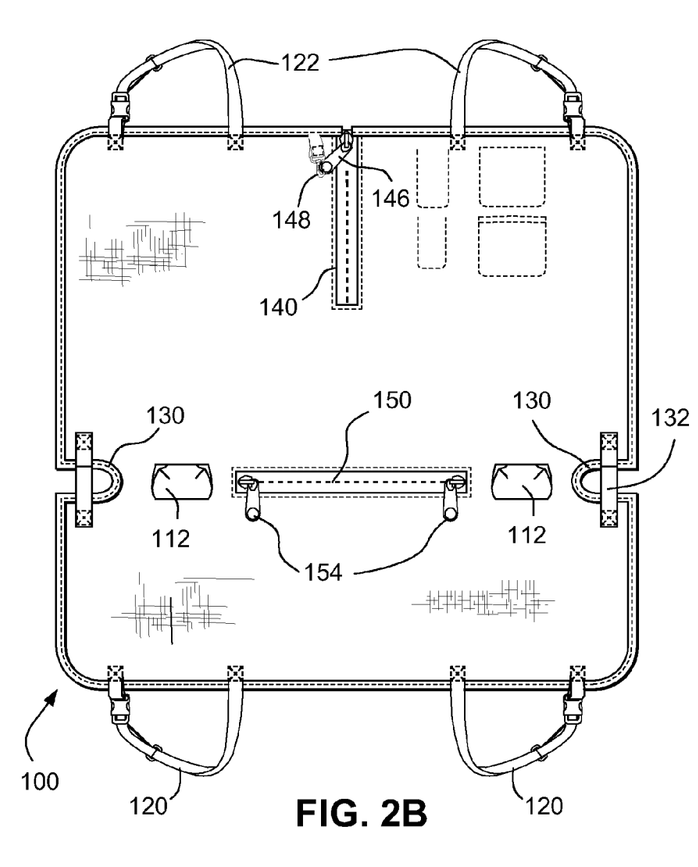

FIGS. 2A and 2B are plan views of a front and back of an exemplary hammock-style seat cover. Numerous features can be see on this exemplary seat cover 100. On both the front and the back sides, zippers 150 and 140 can be accessed by using zipper tabs 152 (front)/154(back) or 142(front)/146(back), allowing for seatbelt access and cover division regardless of which side of the cover is facing up.

Similarly, securing systems 122 and 120 can be secured when either side of the cover is facing up. Fasteners 132 can hold seatbelts in place in notches 130 in both cover positions as well.

In this exemplary view, pocket-holes 110 are shown on the front of the cover and pockets 112 are shown on the back. Since the pockets 112 fit through the holes 110, however, these positions can be easily reversed if the cover is installed back-side up.

Also shown are a plurality of compartments 162, including a water-bottle pouch 160.

Figure 2C:
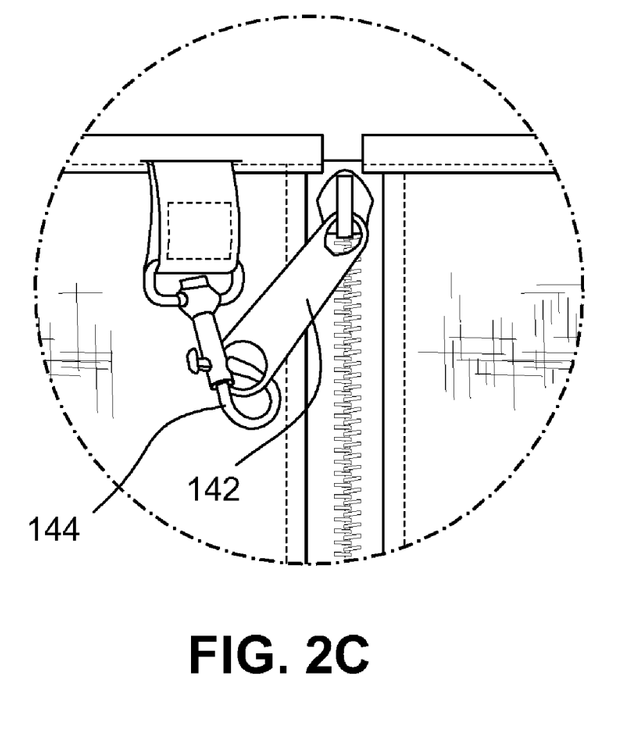
FIG. 2C is a close-up of an exemplary fastening system for a zipper of the hammock-style seat cover of FIGS. 2A and 2B.

FIG. 2C is a close-up of an exemplary fastening system for a zipper of the hammock-style seat cover of FIGS. 2A and 2B. When the cover 100 is installed in a vehicle and zipper 140 is closed, it is possible for an animal in the back to try to climb in front, putting pressure on the zipper 140. If the zipper tab 142/146 is not secured in place, this pressure can cause the zipper 140 to unzip, allowing the animal access to the front seat.

In one exemplary implementation, zipper fasteners 144 and 148 are provided so that the zipper 140 can be secured in the up position when either side of the cover 100 is facing up. This prevents the animal from being able to push the zipper 140 open, since the fastener 144/148 holds the zipper tab 142/146 in place. The fastener 144/148 can be a hook as shown in the figures, or any other suitable fastener that fastens with a corresponding portion of the zipper tab.

Figure 2D:
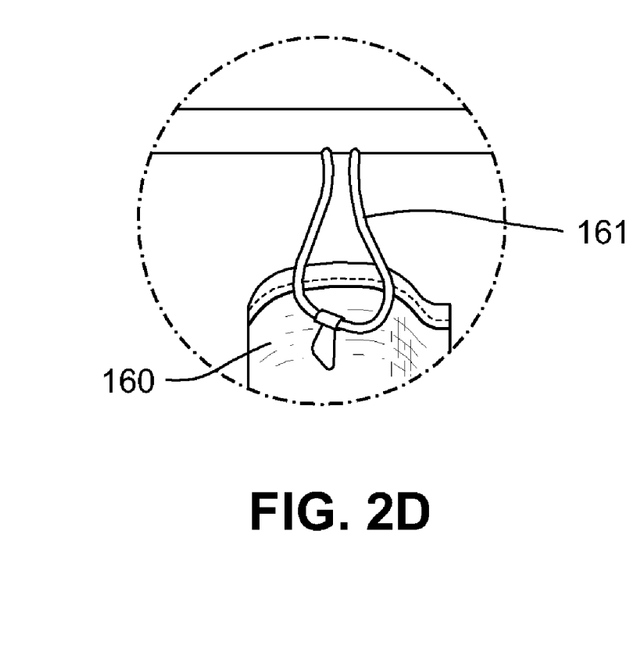
FIG. 2D is a close-up of an exemplary water bottle fastening system for a water bottle holder of the hammock-style seat cover of FIGS. 2A and 2B.

FIG. 2D is a close-up of an exemplary water bottle securing system for a water bottle pouch 160 of the hammock-style seat cover of FIGS. 2A and 2B. Here, the strap 161 goes around the neck of a water bottle to hold it in place in the pouch 160. Any other suitable securing system could also be used, such as a cross-strap, buttonable cover, etc.

Figure 3A:
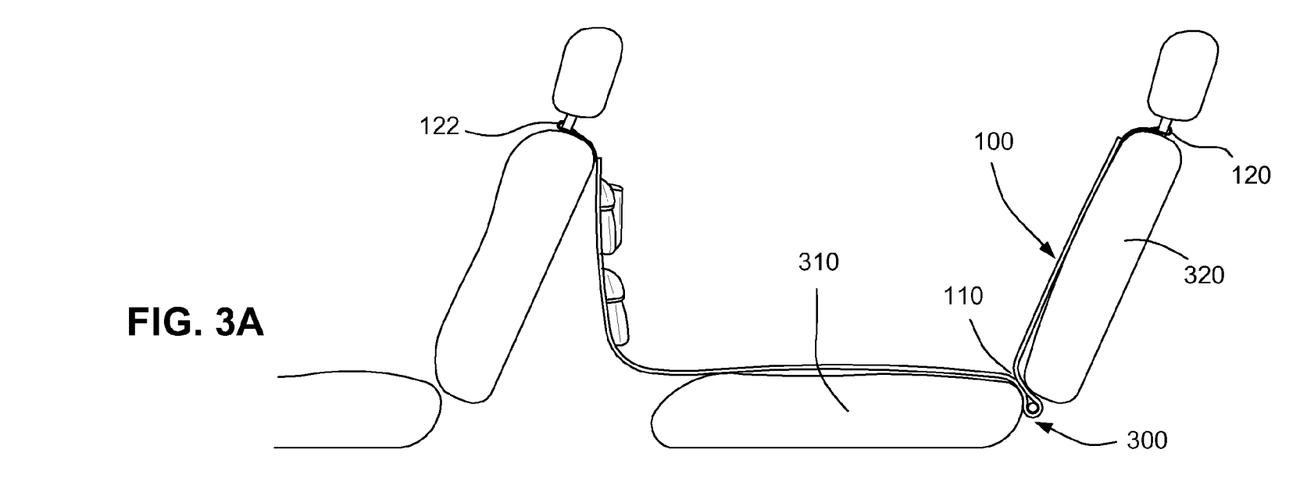
FIG. 3A is a cutaway view of an exemplary hammock-style seat cover having been installed in a vehicle.

FIG. 3A is a cutaway view of an exemplary hammock-style seat cover having been installed in a vehicle. The seat cover 100 secures to the front and back headrests by securing systems 122 and 120. In the gap between the upper 320 and lower 310 portions of the back seat, a pocket 112 has been inserted by pushing the pocket into the gap through hole 110. A securing piece 300 has also been inserted into the pocket 112 to hold the cover 100 in place.

This portion of one exemplary illustrative non-limiting implementation serves to anchor the cover 100 to the seam between the vehicle's seat back 320 and seat bottom 310 cushions. A pocket may be created by folding a piece of fabric in half and sewing it on two sides (for example, a 4"×4" pocket). This pocket may then be sewn to slits in the main portion of the cover, and multiple pockets may be provided. The pockets may be attached where the main portion of the covers aligns with a seam created where the vehicle's rear seat cushion meets the vehicle's seat bottom cushion.

In this exemplary implementation, the securing piece 300 is a tube with a diameter greater than that of the gap between the seats. Since the seat cushions 310, 320 have some give, it is possible to push the tube 300 through them and into the pocket 112. Once the securing piece 300 is in place, it is difficult to move the cover 100 out of position, since the piece tends to remain in a secured position due to the size difference between the diameter of the piece 300 and the gap.

Although a tube has been used in this example, any object or combination of objects whose collective diameter (or distance across as a whole) is greater than the size of the gap could be used. The bigger the difference between the diameter and gap size, the more securely the cover will stay in place.

Figure 3B:
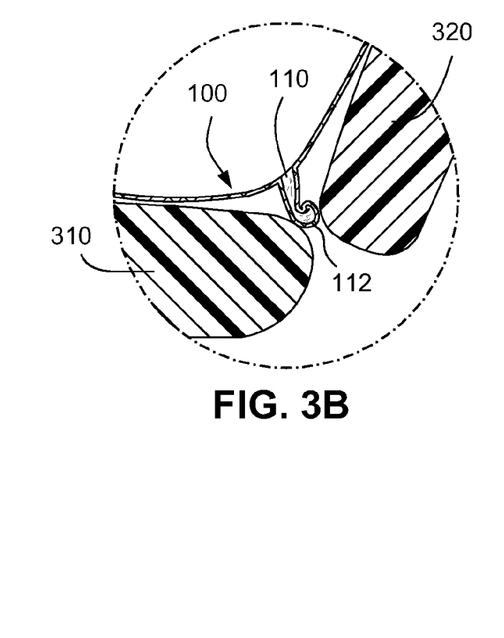
FIG. 3B shows a close-up cutaway view of a pocket of an exemplary hammock-style seat cover just before installation.

FIG. 3B shows a close-up cutaway view of a pocket of an exemplary hammock-style seat cover just before installation. The cover 100 is resting lightly against the seat back 320 and seat bottom 310, and the pocket 112 is outside of the gap and accessible from the upward side of the cover 100 through the hole 110.

Figure 3C:
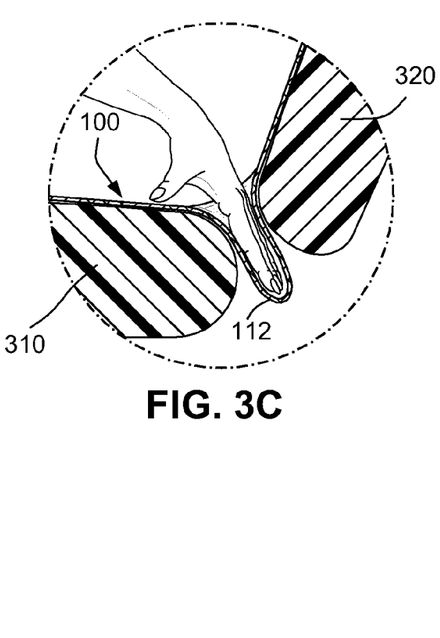
FIG. 3C shows a person installing the pocket of FIG. 3B.

FIG. 3C shows a person installing the pocket of FIG. 3B. The person presses a hand through the opening 110 into the pocket 112. Using the rigidity of the hand, the person slides the pocket 112 into the gap between the upper 320 and lower 310 seat cushions. Once the pocket is in place, the person can then install a securing device into the pocket 112 to hold the pocket 112 in position after the hand is removed.

Figure 3D:
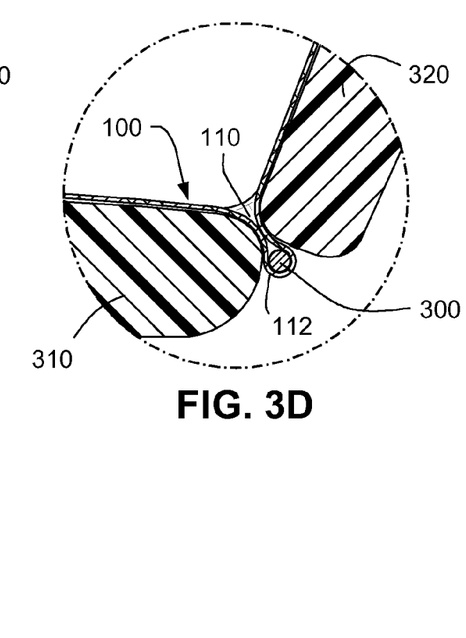
FIG. 3D shows a close-up cutaway of the pocket of FIG. 3B having been installed and provided with an exemplary securing device.

FIG. 3D shows a close-up cutaway of the pocket of FIG. 3B having been installed and provided with an exemplary securing device. In this Figure, the person's hand has been removed and a securing device 300 has been placed into the pocket 112, securing the pocket (and thus the cover 100) in place against the upper 320 and lower 310 seat cushions.

Figure 4:
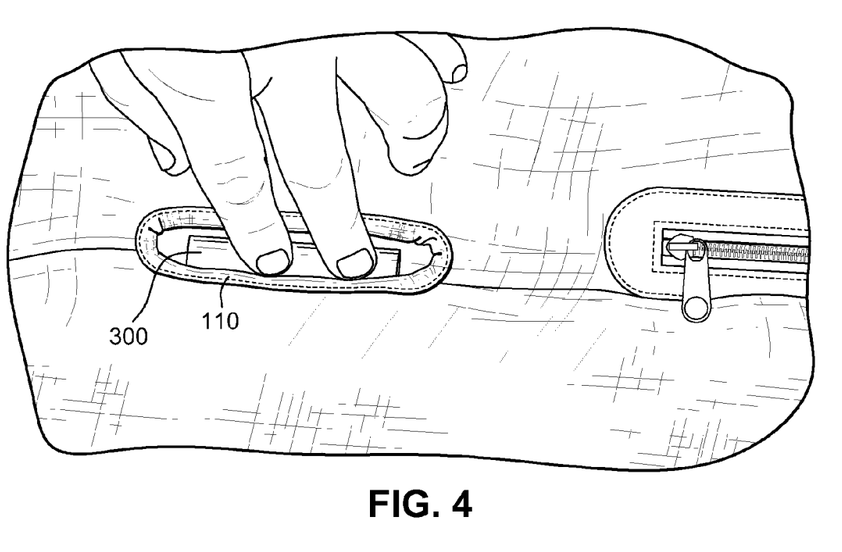
FIG. 4 shows the insertion of the exemplary securing device into a pocket already pushed into a space between an upper and lower seat portion.

FIG. 4 shows the insertion of the exemplary securing device into a pocket already pushed into a space between an upper and lower seat portion. Here, an exemplary tube is used as the securing device 300. The cover is in place, and the pocket has been pushed between the seats. The device 300 is inserted into hole 110 and thus nestled within the pocket between the seat cushions.

Figure 5:
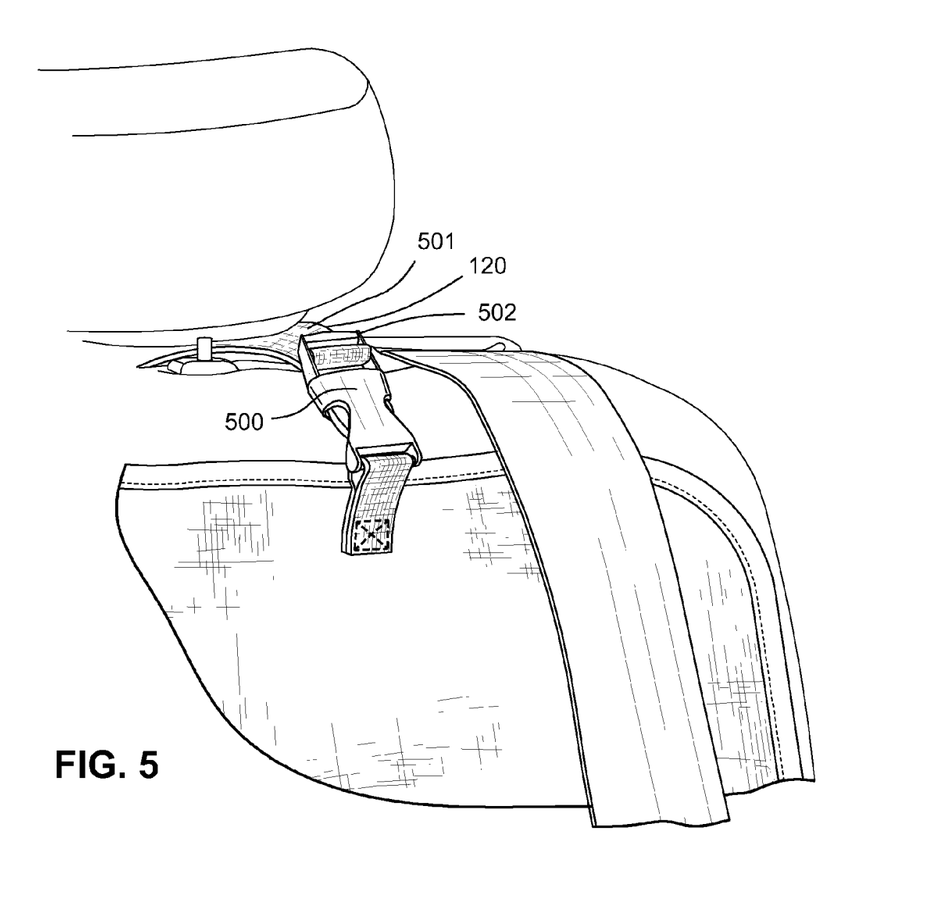
FIG. 5 shows an exemplary securing device for securing one edge of an exemplary hammock-style seat cover to a headrest.

FIG. 5 shows an exemplary securing device for securing one edge of an exemplary hammock-style seat cover to a headrest. Here, the device 120 consists of a nylon strap 501 sewn to the cover. A securing fastener 500 holds the strap 501 in place around a rear-headrest. Although a slide-release buckle 500 is shown, any suitable fastener may be used. The configuration of the securing device may also be modified to account for different types, sizes and styles of headrests in different vehicles.

The main piece of cover material that comprises one exemplary illustrative non-limiting cover drapes down the surface of the rear seats starting at the top of the rear seat. This exemplary illustrative non-limiting implementation uses nylon or polyester webbing 501 to wrap around the headrests at each farthest end in the left and right directions that are mounted to the top of the vehicle's seat back. The webbing is sewn to the main piece of the cover using durable thread (such as 69 lb nylon thread) in a secure (e.g. cross stitched) fashion at one end. This piece of webbing has a "male" side release buckle (though other connection means could be used) sewn in similar fashion at the unattached end of the webbing. This piece of webbing may also have an adjustable slide 502 threaded onto it to allow the webbing to be long enough to adjust to the varying heights of vehicle seats and varying widths of headrests or headrest mounting posts. Spaced at a distance sufficient to accommodate the widest of headrests found in vehicles is a "female" portion of a side release buckle 500 (or other type of connection mechanism). This portion of the side release buckle 500 is sewn to the main portion of the exemplary illustrative non-limiting implementation in a fashion similar to the male portion of the buckle (e.g. cross stitched using 69 lb nylon thread). These pieces of webbing and corresponding side release buckles create a system for attaching the outermost corners of each end of an exemplary illustrative non-limiting cover to each side of the top of the rear seat. This serves to secure the exemplary illustrative non-limiting cover to the upper portion of the vehicle's rear seat.

Although not shown in FIG. 5, the method used to attach the exemplary illustrative non-limiting implementation to the upper portion of the vehicle's front seats is similar to that used to attach to the top of the vehicle's rear seat (see FIGS. 1 & 2). The only difference is the possibility that the top of the front seats would not have headrests, but instead be an upward extension of the seat back to form the equivalent of a headrest. The securing system design is such that it does not matter if headrests or "integrated" headrests exist in the vehicle. The system functions properly since it relies on the force of the hammock's main piece weighing down against the upper sides of the webbing straps to provide sufficient force to secure the attachment.

Figure 6:
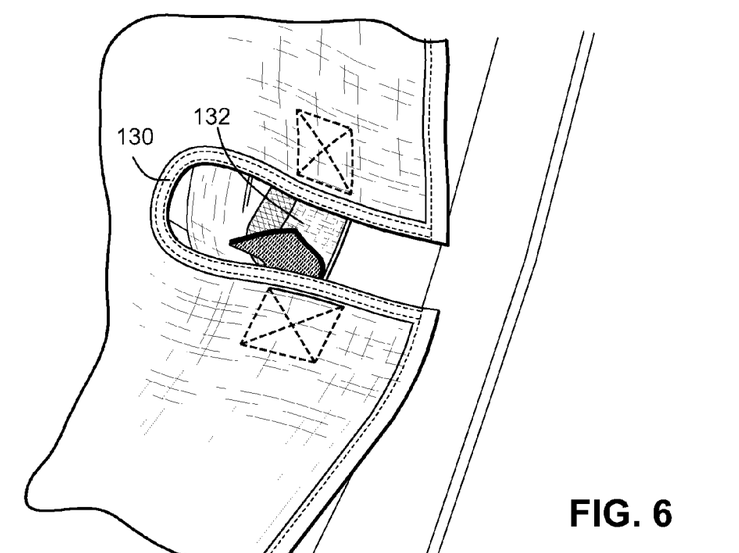
FIG. 6 shows an exemplary securing device for securing a notch in one edge of an exemplary hammock-style seat cover around a restraining device.

FIG. 6 shows an exemplary securing device for securing a notch in one edge of an exemplary hammock-style seat cover around a restraining device. The notch 130 is cut into the cover to allow the shoulder strap or waist strap of a seatbelt to pass therethrough. Once the seatbelt is in place, a fastener 132 can be employed to secure the notch 130 around the strap. This arrangement can help prevent the cover from sliding sideways, especially in vehicles with full length straps running from the top to the bottom of the rear seats. Although the fastener 132 shown is a hook and loop fastener, any suitable fastening system may be used.

This portion of one exemplary illustrative non-limiting implementation helps to hold the main portion of the exemplary illustrative non-limiting cover extended in the lateral (left and right) direction. Strips of hook and loop fasteners 132 (or other means such as snap hook fasteners with corresponding grommets) are sewn to the main portion of the cover using a durable thread in a secure (e.g. cross stitched) fashion such that a hook strip can extend and connect to a corresponding loop strip that is sewn on the opposite side of the notch. These hook and loop fasteners are sewn on the outer edges of the notch 130 a distance such that they form an outer boundary of a loop around the vehicle's shoulder strap (the main portion of the exemplary illustrative non-limiting cover is on one side of the shoulder strap and the connected hook and loop fastener strips 132 are on the other side of the shoulder strap). This method forms a loop around the shoulder strap. Since the hook and loop fasteners 132 extend around the shoulder strap in a loop formed by the notch in the main piece of the cover, the connection is not likely to be pulled apart by movement of the vehicle's shoulder strap.

Figure 7:
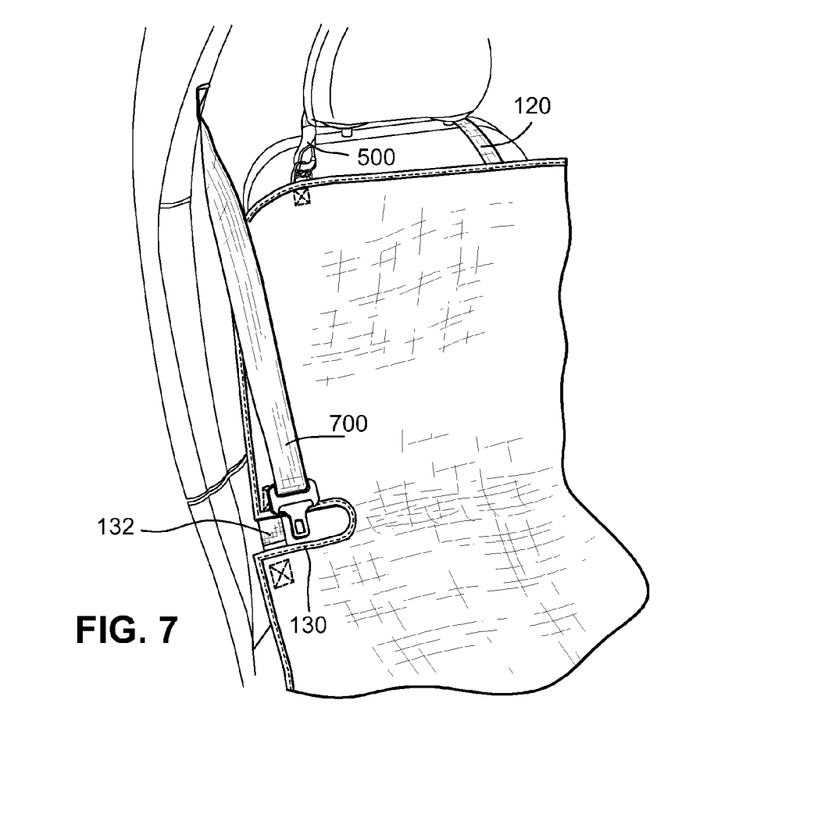
FIG. 7 shows a partial view of an exemplary hammock-style seat cover having been installed in a vehicle.

FIG. 7 shows a partial view of an exemplary hammock-style seat cover having been installed in a vehicle. From this view it is possible to see the fastener 500 of the securing system 120 securing the cover to the rear headrest. The cover is also secured around the rear shoulder strap 700 by notch 130 and fastener 132.

Figure 8:
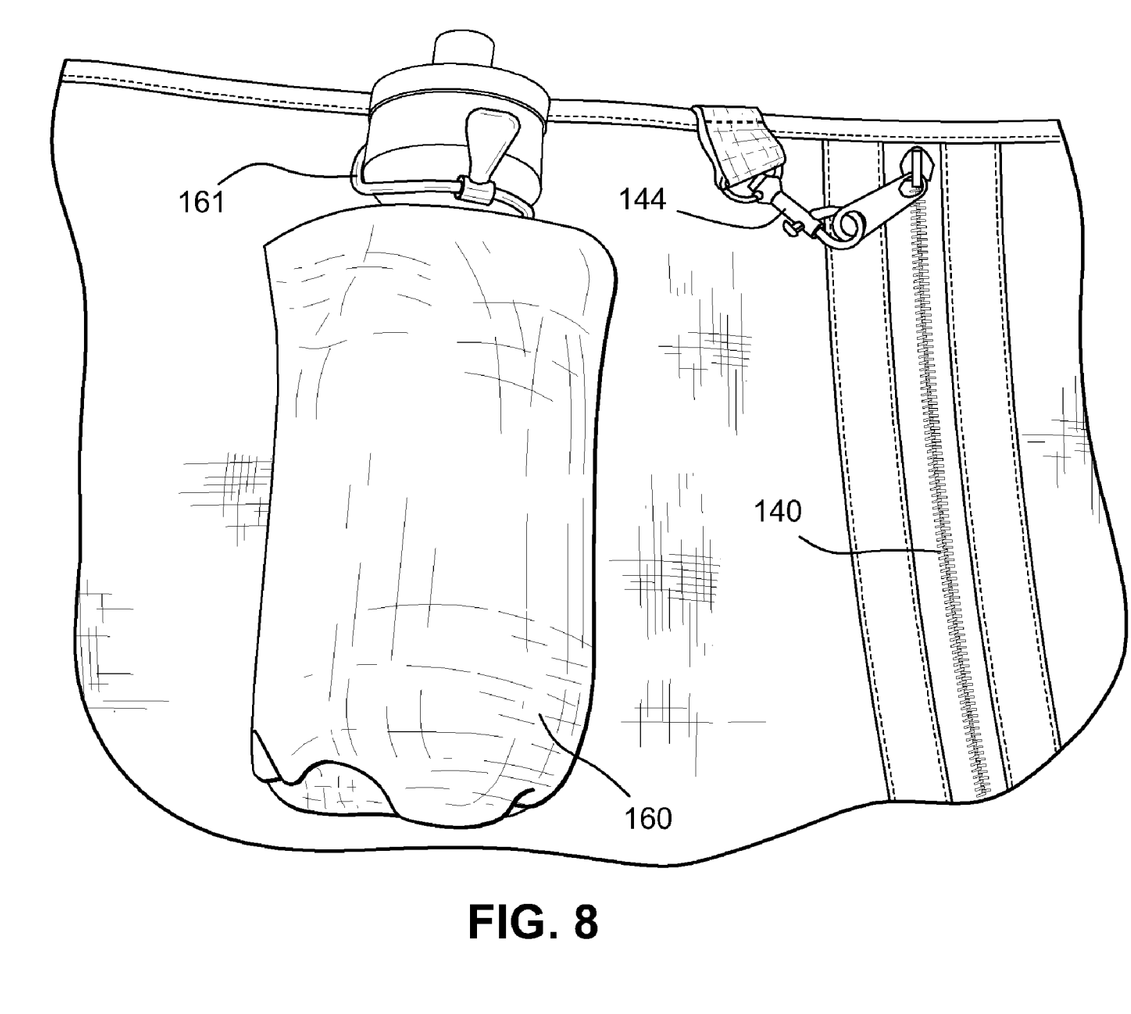
FIG. 8 shows a close up view of an exemplary dividing zipper with an exemplary fastening system.

FIG. 8 shows a close up view of an exemplary dividing zipper with an exemplary fastening system. The dividing zipper 140 divides a portion of the exemplary illustrative non-limiting seat cover into two portions, so that one portion can allow a person to sit while the other portion protects the car against animal damage.

The zipper tab 142 is used to open and close the zipper 140. Unfortunately, once the exemplary hammock is installed, the weight of a dog on the zipper 140 can cause the zipper tab 142 to slide down and pull open the zipper 140. Accordingly, the zipper tab 142 can fasten to a hook or other suitable fastener 144 and be prevented from sliding down due to gravity or pressure from a dog trying to get into the front seat.

This split can be either closed or opened using a zipper 140 (though other means such as hook and loop fasteners, buttons, snaps or other means could be used).

Also seen in this Figure is a water bottle pouch 160 and a fastener 162 to hold a water bottle in place if the cover is moved or inverted.

Figure 9:
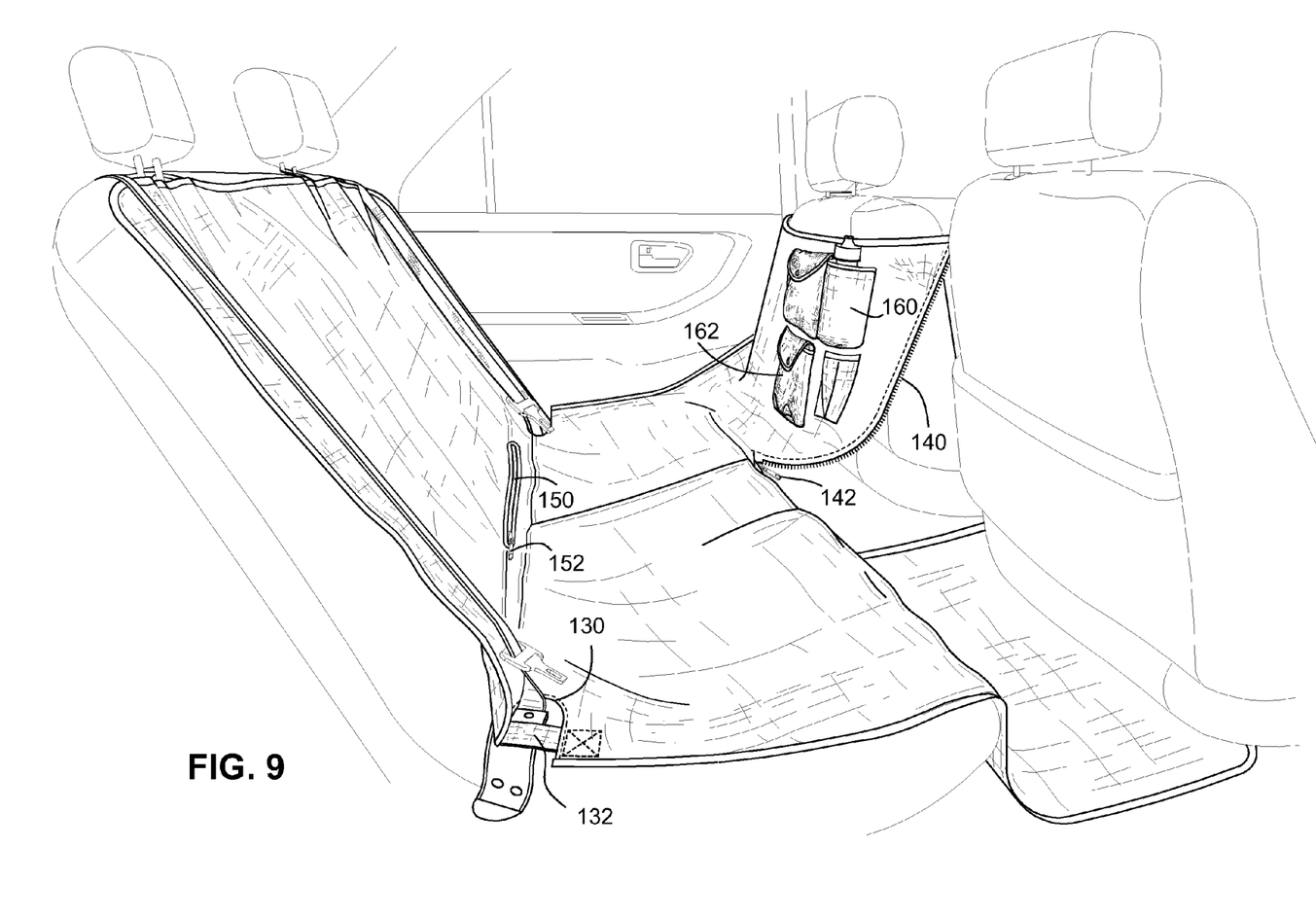
FIG. 9 shows a view of an exemplary hammock-style seat cover having been installed and an exemplary dividing zipper having been opened.

FIG. 9 shows a view of an exemplary hammock-style seat cover having been installed and an exemplary dividing zipper having been opened. In this figure, a person has opened half of the divider and lowered it to the floor, allowing a human and animal to ride in the back together.

When the zipper 140 is open (unzipped using tab 142), one side of the exemplary illustrative non-limiting cover can be taken off of the corresponding front seat headrest and lowered into its down position (hanging down the front of the rear seat's bottom cushion). This allows a human's legs to extend down into the floor area of the vehicle, while the opposite side of the cover can remain attached to its corresponding front seat headrest and thus maintain the hammock form for the side on which the animal is riding.

Another feature of this exemplary illustrative non-limiting cover, related to its ability to have one side of the cover in the up position while the other half is in the down position, is the use of a bottle strap. The exemplary illustrative non-limiting implementation has pouches 160, 162 sewn into the barrier portion of the hammock. One of these pouches 162 is designed to hold a water bottle. Since the side of the barrier that has the bottle pouch 162 and associated water bottle can potentially be in the down position, it is possible that the upside down bottle can fall out of its pouch. One exemplary illustrative non-limiting implementation addresses this problem by including a rubber strap, or other fastening system, sewn to the cover just above the water bottle pouch 162. The user of the cover can pull this strap around the top neck of a water bottle and secure the bottle in place. This securing system is also useful to keep the bottle from failing out of its pouch when riding over rough terrain or when a dog is attempting to pull the bottle out of its pouch.

Figure 10:
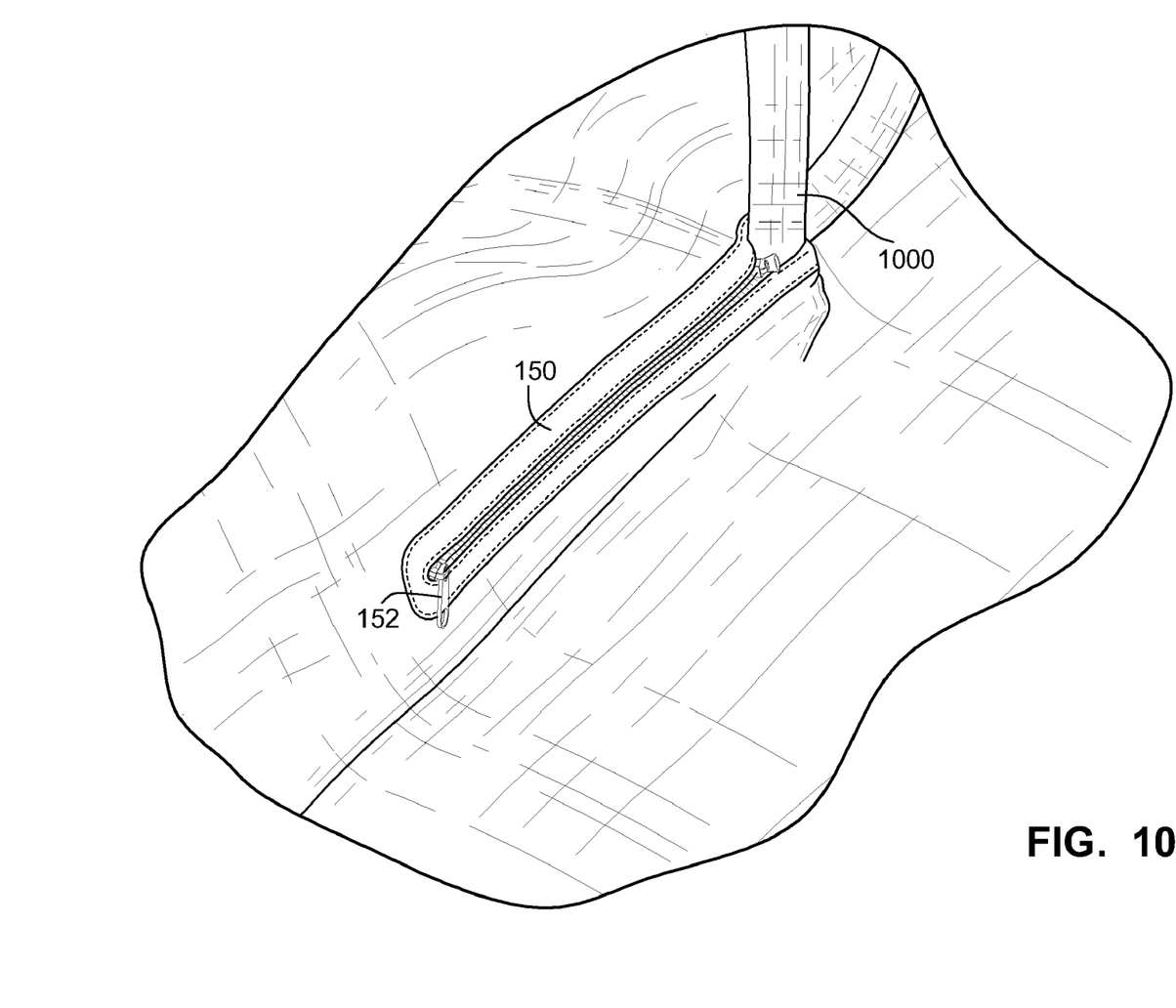
FIG. 10 shows a view of an exemplary 2-way zipper allowing access to one or more vehicle restraint pieces.

FIG. 10 shows a view of an exemplary 2-way zipper allowing access to one or more vehicle restraint portions. Since the exemplary illustrative non-limiting cover serves as a protective cover for a vehicle's rear seat, it must also extend across the vehicle's seat belt buckles located at the seam where the vehicle's seat back and bottom cushions meet. Therefore, access may be provided to these seat belt buckles when the cover is installed.

This access is accomplished in one exemplary illustrative non-limiting implementation by having a zipper 150 located across the cover that extends from one end of the vehicle's leftmost seat belt buckle across to the outer end of the opposite seat belt buckle. A two-way zipper sewn into the slit allows for this opening to be closed for all areas except those necessary to attach a shoulder strap, dog travel harness, child seat, etc. to the seat belt buckle. The zipper tabs 152 make it possible to open only that part of the zipper 150 needed to access the corresponding seat belt buckle 1000.

There are four main components to the exemplary illustrative non-limiting implementation that serve to ensure that it stays in place once installed. These correspond to the four main points of leverage necessary to fasten the cover into place. The headrest connections at the top of the rear seat lock the trailing edge of the cover into place. The tuck-in anchor pockets lock the cover against the vehicle's seats at the midway point (downward) thus keeping the cover from sliding forward so that the cover does not sag in between the gap between the front and rear seats. The headrest connections at the top of the front seats serve to complete the hammock form and lock the leading edge of the cover into place. Finally, the shoulder strap connections serve to secure the exemplary illustrative non-limiting implementation in the lateral (left and right) directions, assisted by the anchoring effect of the tuck-in pockets.

The design of the exemplary illustrative non-limiting implementation is such that it is extremely easy to install. For example, to install one exemplary implementation, a user only needs to:
 1. Slip adjustable straps over the headrests at the top of the rear seats
 2. Spread the cover down across the face of the vehicle's rear seats, then across the vehicle's seat bottom cushion, then slip the adjustable straps over the top of the vehicle's front seats.
 3. Adjust the headrest straps to obtain the desired alignment of the cover over the vehicle's seats
 4. Open the hook and loop fasteners located by the vehicle's shoulder straps, extend the main portion of the cover around the shoulder straps where the notches in the main portion are located, and connect the hook and loop fasteners.
 5. Reach across the vehicle's seat and tuck the empty anchor pockets in between the seam where the vehicle's seat back and bottom cushions meet
 6. Insert an anchor post into each of the two anchor pockets.

Though use of a towel or blanket may be initially just as simple (or even easier) to install, these approaches may have problems since they need to be re-installed continually as the human or canine passengers sit on the covers and move around. The approach possible in the exemplary illustrative non-limiting implementation requires the simple steps to be performed just once per trip, since the cover stays in place once installed.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

The invention claimed is:
 1. A seat cover apparatus comprising:
 a protective first side;

a plurality of front securing straps arranged in proximity to a first edge of the apparatus, to secure the first edge to a plurality of protrusions provided to a first set of one or more seats in a vehicle;

a plurality of rear securing straps arranged in proximity to a second edge of the apparatus, opposite the first edge, to secure the second edge to a plurality of protrusions provided to a second set of one or more seats in the vehicle;

a plurality of pockets accessible through the protective first side and capable of being slid into a gap between an upper portion of the second set of seats and a lower portion of the second set of seats; and a plurality of securing objects, wherein one or more of the securing objects can fit within each of said pockets, wherein all one or more securing objects in an individual pocket, once placed within an individual pocket, comprise a mass having greater diameter across than the gap between the upper and lower portions of the second set of seats, such that if the individual pocket is slid into the gap and the corresponding one or more securing objects are placed therein, the filled pocket resists removal from the gap due at least in part to the diameter of the mass within the pocket.

2. The apparatus of claim 1, further including a 2-way first zipper arranged on said protective first side such that opening the zipper allows access through the apparatus, the first zipper further arranged such that when the apparatus is installed in the vehicle, opening the first zipper allows access to at least some portion of one or more restraining devices provided to the vehicle.

3. The apparatus of claim 2, wherein the apparatus can be reversibly installed and includes a protective second side, wherein the 2-way zipper has tabs accessible when the apparatus is reversibly installed.

4. The apparatus of claim 1, further including a plurality of notches cut into opposite third and fourth edges of the apparatus, the notches provided with securing fasteners thereacross, wherein, when the apparatus is installed in the vehicle, the notches allow passage of at least portions of vehicle restraining devices to pass therethrough, and wherein the fasteners can be fastened to secure the portions of the vehicle restraining devices within the notches.

5. The apparatus of claim 1, further including a plurality of pouches arranged on the protective first side, at least one of the pouches being fastenable in a closed position, and at least a second of the pouches designed to hold a water bottle, wherein the second of the pouches further includes a securing fastener to hold the water bottle in place.

6. The apparatus of claim 1, wherein the apparatus can be reversibly installed and includes a protective second side, wherein the plurality of pockets can be pushed through from the protective second side to protrude out from the protective first side.

7. The apparatus of claim 1, wherein the protrusions are headrests.

8. The apparatus of claim 1, wherein the one or more securing objects are lengths of tubular material having a larger diameter than the gap.

9. The apparatus of claim 1, further including a second zipper arranged on said protective first side, a tab of the zipper including a fastener, securable, when the zipper is in a closed position, to a first corresponding fastener arranged on said apparatus, wherein one end of the second zipper ends at the first edge of the apparatus, wherein opening the second zipper causes a separation between two portions of the apparatus such that when the apparatus is installed in a vehicle, at least one of the separated portions rests within a space behind the first set of one or more seats.

10. The apparatus of claim 9, wherein the apparatus can be reversibly installed and includes a protective second side, wherein the zipper has a second tab accessible when the apparatus is reversibly installed and provided with a second fastener, securable, when the zipper is in a closed position, to a second corresponding fastener arranged on said apparatus.

11. A method of securing a protective seat cover into a vehicle, the cover including a plurality of first securing devices to secure a first edge of the seat cover to a first series of protrusions provided to a first set of one or more seats in the vehicle, a plurality of second securing devices to secure a second edge of the seat cover to a second series of protrusions provided to a second set of one or more seats in the vehicle, a plurality of pockets accessible through a protective first side of the apparatus, and a plurality of securing objects, wherein one or more of the securing objects can fit within each of said pockets, the method comprising:

attaching the first set of securing devices to the first series of protrusions;

attaching the second set of securing devices to the second series of protrusions;

pushing, through the first side of the apparatus, into the pockets and sliding the pockets into a gap between and upper and lower portion of the second set of seats; and inserting, through the first side of the apparatus, after the pockets are pushed into the space, one or more of the plurality of securing objects into each of the plurality of pockets.

* * * * *